United States Patent [19]

Woodier

[11] 4,419,707
[45] Dec. 6, 1983

[54] FLEXIBLE BAND POSITIONING DEVICE FOR A READ/WRITE HEAD

[75] Inventor: James G. Woodier, Morton Grove, Ill.

[73] Assignee: Teletype Corporation, Skokie, Ill.

[21] Appl. No.: 243,167

[22] Filed: Mar. 12, 1981

[51] Int. Cl.³ .............................................. G11B 5/55
[52] U.S. Cl. .................................... 360/106; 74/89.2; 74/108
[58] Field of Search .............. 360/106; 74/89.2, 89.22, 74/108

[56] References Cited

U.S. PATENT DOCUMENTS

| | | | |
|---|---|---|---|
| 663,805 | 12/1900 | Crawford | 74/89.22 |
| 2,559,733 | 7/1951 | Pitman et al. | 74/108 |
| 2,690,082 | 9/1954 | Orcutt | 74/108 |
| 3,167,962 | 2/1965 | Scotto | 73/490 |
| 3,488,098 | 1/1970 | Sobczak | 308/6 |
| 3,859,662 | 1/1975 | Habich et al. | 360/106 |
| 3,881,189 | 4/1975 | Mayeda | 360/106 |
| 4,161,004 | 7/1979 | Dalziel | 360/106 |
| 4,170,146 | 10/1979 | Owens | 74/89.2 |
| 4,366,722 | 1/1983 | Hasler | 360/106 X |

FOREIGN PATENT DOCUMENTS 142769  7/1980  Fed. Rep. of Germany ...... 360/106

OTHER PUBLICATIONS

IBM, TDB; vol. 14, No. 6; Nov. 71; "Rotary Scan Mechanism" by Arrington, pp. 1802–1804.

Primary Examiner—Aristotelis M. Psitos
Assistant Examiner—K. Wong
Attorney, Agent, or Firm—A. A. Tirva; J. C. Albrecht

[57] ABSTRACT

A flexible band positioning device arranged to convert rotaty motion of an outout drum of a stepper motor to linear motion of a carriage supporting a read/write head. A flexible band is attached to the drum and is at least partially wrapped around it. The end portions of the band are each guided around a different idler roller and are attached to a support frame. The idler rollers are rotatably mounted on the carriage and upon wrapping and unwrapping of the band around the drum, caused by rotary movement of the drum, move the carriage linearly.

5 Claims, 4 Drawing Figures

FLEXIBLE BAND POSITIONING DEVICE FOR A READ/WRITE HEAD

DESCRIPTION

TECHNICAL FIELD

This invention relates to mechanisms for converting rotary motion into linear motion and more particularly, to a flexible band device for converting rotary motion of a drum driven by a stepper motor into linear motion of a read/write head.

BACKGROUND ART

Flexible band devices for converting rotary motion of a drum or a roller into linear motion are well known and are disclosed, for example, in U.S. Pat. No. 3,167,962 issued to D. P. Scotto and U.S. Pat. No. 3,488,098 issued to B. J. Sobczak.

Furthermore, a flexible band device has been incorporated into a magnetic head positioning mechanism as disclosed in U.S. Pat. No. 4,170,146 issued to W. M. Owens. Therein, angular movement of a stepper motor output drum is converted to linear motion of a carriage which carries a magnetic head along a diameter of a flexible record disk known in the trade as a "floppy disk". The disclosed mechanism has a stainless steel flexible band wrapped around the output drum of the stepper motor with the ends of the band coming off the drum tangentially and aligned with each other. One end of the band has a slot in it through which the other end passes. The ends of the band are attached to the carriage carrying the magnetic head and thereby angular movements of the drum are transmitted to the carriage as linear motion.

The standard floppy disk, which may be a disk of plastic coated with iron-oxide, has a track density of 48 tracks per inch on a recording area approximately 0.729 inches wide. The flexible band-drum connection, because of its construction, limits the drum to one partial revolution of approximately 320 degrees. Within this partial revolution, the drum must move the read/write head across the width of the recording area. Commercially available floppy disk drives utilizing flexible band position devices for positioning of read/write heads over a recording area usually employ a stepper motor having a step angle of 3.6 degrees and an output drum having a circumference of approximately 2 inches and a diameter of 0.66 inches. While such a positioning device provides positioning of the head with the required accuracy, one of its drawbacks is that it is costly because the stepper motor with a 3.6 degree step angle is a relatively expensive item.

Attempts have been made to reduce the cost of flexible band positioning devices by incorporating a less expensive stepper motor. For example, a sheet metal stepper motor which costs approximately two and a half times less than a conventional stepper motor is commercially available and has been considered for use in the flexible band positioning device. The problem however, with the use of a sheet metal stepper motor is that it is not available with a step angle of less than 7.5 degrees. Thus, use of a stepper motor with a 7.5 degree step angle requires an output drum with a circumference of approximately 1 inch and a diameter of 0.33 inches. Wrapping and unwrapping of the metal band around the drum with such a small diameter will introduce stresses in the material which could cause fatigue failure and thus destroy the positioning device.

DISCLOSURE OF THE INVENTION

In accordance with the present invention, I provide a flexible band positioning device wherein each end of the flexible band wrapped around an output drum of a stepper motor passes around a different idler roller, rotatably mounted on a carriage for moving a read/write head. The two idler rollers permit a two to one reduction in the linear step of the carriage.

THE DRAWING

DETAILED DESCRIPTION

Figure 1:
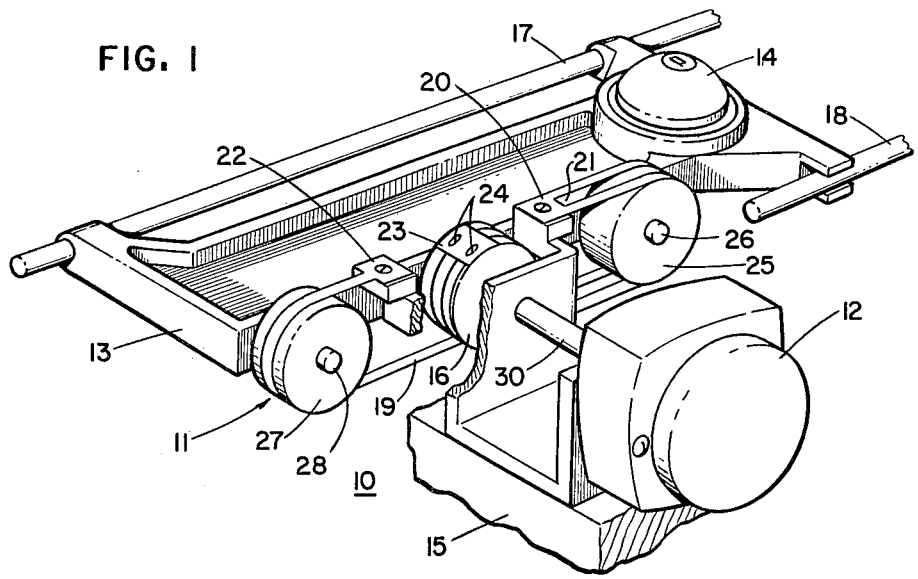
FIG. 1 is a partial perspective view of a disk drive unit having a flexible band positioning device.

FIG. 1 shows a partial view of a disk drive unit 10 incorporating a flexible band positioning device 11. The positioning device 11 converts angular motion of an output drum 16 of a stepper motor 12 into linear motion of a carriage 13 which supports a read/write head 14. The stepper motor 12 is securely fastened to a disk drive support frame 15 and has an output shaft 30 upon which the drum 16 is mounted. The carriage 13 is movably mounted on guide rods 17 and 18 which are fastened to frame 15. The carriage 13 and its guide rods 17 and 18 are positioned in such a way that the carriage 13 moves in a line along the diameter of a recording disk (not shown) which may be a plastic disk covered with iron-oxide. The movement of the read/write head 14, which may be magnetic, allows it to selectively access the areas of the recording disk which are designated for storage of information.

The carriage 13 is positioned in response to signals supplied to the stepper motor 12 by a control unit (not shown) of the disk drive unit 10. The control unit may be in a form of a digital computer. The stepper motor 12 in response to the received signals from the control unit rotates the output shaft 30 and thus the drum 16 through a predetermined angular displacement. The angular displacement of the drum 16 is converted into a linear displacement of the carriage 13 by the flexible band device 11 which includes a thin flexible band 19 which may be made of stainless steel and with a typical thickness of 0.002 inches. The flexible band 19 may be attached to drum 16 by a bar 23 and two flat head screws 24. The drum 16 may also be made of stainless steel and, for example, could have a diameter of 0.66 inches with a circumference of 2 inches.

Figure 2:
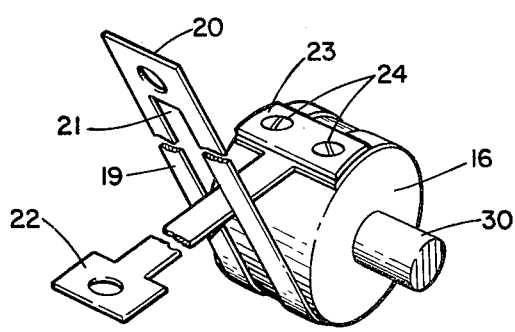
FIG. 2 is a perspective view illustrating construction of a flexible band and its attachment to the output drum of a stepper motor.

FIG. 2 illustrates construction of flexible band 19 and its attachment to drum 16. One end 20 of the flexible band 19 has a slot 21 through which the other end 22 of the flexible band 19, which end is narrower than the width of the slot 21, passes. The flexible band 19 is wrapped, at least partially, around the drum 16 and the two ends of the bands 20 and 22 are brought off the drum tangentially so that they lie substantially in the same plane parallel to the path of travel of the carriage 13 and are 180 degrees apart. After coming off the drum 16, the end 20 of the flexible band 19 is then passed around an idler roller 25. The idler roller 25 is rotatably mounted on a shaft 26 affixed to the carriage 13 and has an axis of rotation parallel to the axis of rotation of the drum 16. The end 22 of the flexible band 19 is passed around an idler roller 27. The idler roller 27 is rotatably mounted on a shaft 28 affixed to carriage 13 and has an axis of rotation parallel to the axis of rotation of the drum 16. Idler rollers 25 and 27 may be made of stainless steel and may have diameters less than, equal to, or greater than the diameter of the drum 16. Each end 20 and 22 of the band 19, after passing around idler rollers 25 and 27 respectively, is attached to support frame 15 so that each end lies in a plane which is substantially parallel to the plane containing the portions of the flexible band 19 coming off the drum 16. The ends 20 and 22 of band 19 may be attached to frame 15 with flat head screws 21.

Figure 3A:
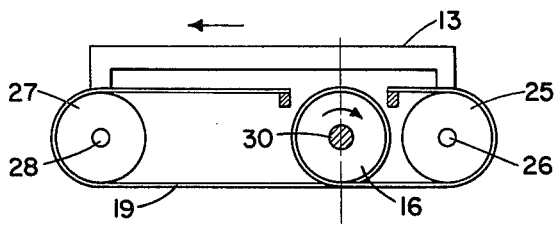
FIGS. 3a and 3b are detailed schematic views illustrating the operation of the flexible band positioning device.
Figure 3B:
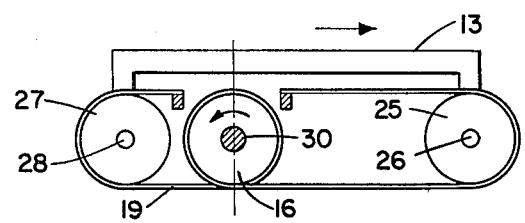

As pointed out before, control signals received by the stepper motor 12 are converted into angular displacement of the drum 16 which causes one end of the band 19 to unwrap from the drum 16 while the other end wraps around the drum 16 with corresponding linear movement being imparted to the carriage 13. FIGS. 3a and 3b illustrate angular movements of drum 16 and corresponding linear movements of the carriage 13.

What is claimed is:

1. Apparatus for positioning a read/write head over a record means, said apparatus comprising:
    a stepper motor mounted on a support frame, said motor having an output shaft;
    a drum mounted on said output shaft;
    a carriage for supporting said read/write head, said carriage mounted on at least one guide surface located on said support frame;
    a pair of spaced apart idler rollers rotatably mounted on said carriage;
    a flexible band wrapped at least partially around said drum, said band having two ends coming off said drum, each end passing around a different idler roller before being secured to said frame, wherein each idler roller is positioned so that portions of said band coming off said drum lie in a plane substantially parallel to the path of travel of said carriage, and portions of the band coming off each roller are secured to the frame so that each is parallel to said plane, whereby angular displacement of said drum through a specific angle results in a corresponding linear displacement of said carriage, said linear displacement being of the same magnitude along the entire path of travel of said carriage.

2. Apparatus in accordance with claim 1 wherein the axes of rotation of said idler rollers and said drum are substantially parallel to each other.

3. Apparatus in accordance with claim 2 wherein the flexible band is attached to the drum and wherein one end of flexible band has a longitudinal slot and the other end of the band is narrower than the slot and is positioned so it extends through the slot.

4. Apparatus for positioning a read/write head over a record means, said apparatus comprising:
    a stepper motor mounted on a support frame, said motor having an output shaft;
    a drum mounted on said output shaft;
    a carriage for supporting said read/write head, said carriage mounted on at least one guide surface located on said support frame;
    a pair of idler rollers rotatably mounted on said carriage, each roller positioned on a different side of said drum so that the axes of rotation of said drum and rollers are parallel to each other and lie in a plane which is substantially parallel to the path of travel of said carriage;
    a flexible band wrapped at least partially around said drum, said band having two ends coming off said drum, each end passing around a different idler roller before being secured to said frame, wherein each idler roller is positioned so that portions of said band coming off said drum lie in a plane substantially parallel to the path of travel of said carriage, and portions of the band coming off each roller are secured to the frame so that each is parallel to said plane, whereby angular displacement of said drum through a specific angle results in a corresponding linear displacement of said carriage, said linear displacement being of the same magnitude along the entire path of travel of said carriage.

5. Apparatus in accordance with claim 4 wherein said drum and said idler rollers have diameters of substantially the same magnitude.

* * * * *